Aug. 14, 1928.  K. W. HOLZAPFEL  1,680,294
METAL CANDY MOLDING DEVICE
Filed Dec. 21, 1923
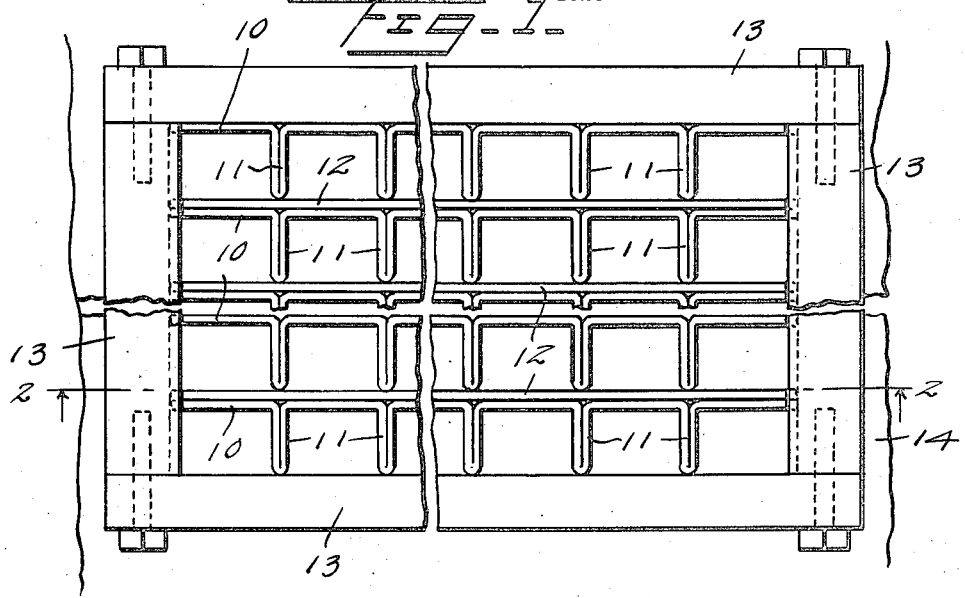
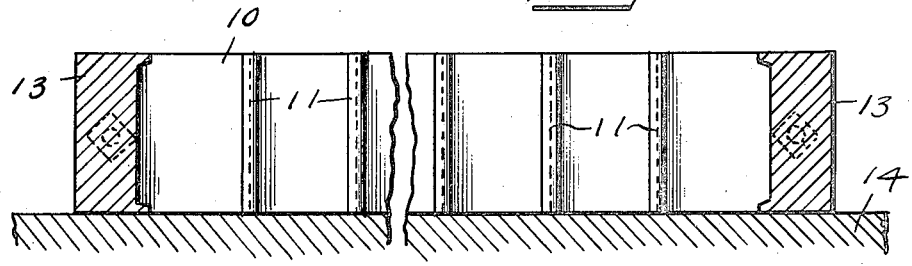
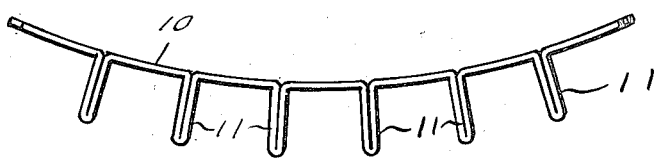
Inventor
K. W. Holzapfel
By Watson E. Coleman
Attorney Patented Aug. 14, 1928.

1,680,294

UNITED STATES PATENT OFFICE.

KARL W. HOLZAPFEL, OF LARNED, KANSAS.

METAL CANDY-MOLDING DEVICE.

Application filed December 21, 1923. Serial No. 682,043.

This invention relates to candy molds and has for an important object thereof the provision of a candy mold readily adapted to standards of manufacture and from which the molded candy may be readily removed.

A further object of the invention is to provide a device of this character which is readily manipulated, readily cleansed and which may be very cheaply produced.

These and other objects I attain by the construction shown in the accompanying drawings, wherein for the purpose of illustration is shown a preferred embodiment of my invention and wherein:—

Figure 1 is a plan view of a candy mold constructed in accordance with my invention;

Figure 2 is a section on the line 2—2 of Figure 1;

Figure 3 is a view illustrating the manner in which the strips are flexed to release the candy blocks therefrom.

Referring now more particularly to the drawings, the mold includes a molding strip consisting generally of a base 10 formed of resilient material and having projecting from one side thereof partition walls 11 of the same width as the base and of the desired height or depth. This molding strip is preferably produced by employing a single strip of resilient material which, at stated intervals, is folded to produce the projecting partitions, as shown in the accompanying drawings. The number of projecting partitions provided will depend upon the number of candies to be molded in combination with the strip. If six blocks of candy are to be molded at a single operation, then four of these partitions are provided. The mold strip will be provided in strips of a width and partitions of a depth suitable to the needs of the manufacturer. If, for example, the manufacturer desired to pack a box of a certain size with a given number of caramels, the bars will be produced in such manner that the desired number of caramels may be fitted into such given space.

In combination with the mold strips, I employ separating strips 12 and framing strips 13. In the use of the molds, the mold strips are laid upon their slides upon the usual slab 14 and a desired number of these strips placed in assembled relation so that the free edges of the partitions 11 of one strip oppose the base 10 of the next adjacent strip. Between adjacent strips, separating strips 12 are positioned and after the desired number of mold strips and separating strips have been properly positioned, the framing strips 13 are placed in position, closing the end molds and the outer faces of the molds of the outermost mold strip 10. The candy is then poured into the box thus formed on the upper surface of the slab and allowed to cool. After cooling, the framing is removed and the mold strips may be readily separated by inserting a spatula between each strip and its associated separating strip 12. When it is desired to remove the molded candy from the strips, the ends of the strips are engaged with the fingers and the face of the strip having the partitions 11 thereon flexed outwardly, thus increasing the size of the pockets and permitting the candy to be dropped therefrom.

It will be obvious that a mold of this character may be readily cheaply produced and is easily kept in a sanitary condition and facilitates materially the molding and removal of the candy from the mold. Since it is readily made in different sizes, it likewise facilitates manufacture so far as packing candy for shipment is concerned.

It will be obvious that the construction hereinbefore set forth is obviously capable of a certain range of change and modification and I accordingly do not limit myself to such specific structure except as hereinafter claimed.

I claim:—

In a candy mold, a rigid outer frame, a plurality of parallel mold strips arranged within the frame and each comprising a single strip of resilient material bent to form a base having projecting outwardly from one side thereof a plurality of partitions, each partition comprising parallel flatly engaging portions of the strip and separating strips arranged between each mold strip and the ends of the partitions of the next adjacent mold strip.

KARL W. HOLZAPFEL.